United States Patent
Geffers et al.

(10) Patent No.: US 12,460,723 B2
(45) Date of Patent: Nov. 4, 2025

(54) RING-SHAPED JOINT COVER

(71) Applicant: Geffers Patent GmbH, Gundelfingen (DE)

(72) Inventors: Sandra Geffers, Gundelfingen (DE); Heiko Geffers, Gundelfingen (DE)

(73) Assignee: Geffers Patent GmbH, Gundelfingen (DE)

( * ) Notice: Subject to any disclaimer, the term of this patent is extended or adjusted under 35 U.S.C. 154(b) by 168 days.

(21) Appl. No.: 18/146,646

(22) Filed: Dec. 27, 2022

(65) Prior Publication Data
US 2023/0265922 A1    Aug. 24, 2023

(30) Foreign Application Priority Data
Feb. 18, 2022   (EP) .................................... 22157396

(51) Int. Cl.
*F16J 15/02* (2006.01)
*A47K 3/00* (2006.01)

(52) U.S. Cl.
CPC ............ *F16J 15/022* (2013.01); *A47K 3/008* (2013.01)

(58) Field of Classification Search
CPC .......... F16J 15/022; E03D 9/00; E03D 13/00; E03D 2201/00; E03D 11/00; E03D 11/14; A47K 3/001; A47K 3/008; A47K 3/16; F15J 15/067
See application file for complete search history.

(56) References Cited

U.S. PATENT DOCUMENTS

| | | | | |
|---|---|---|---|---|
| 2,090,588 A | | 8/1937 | Witsell | |
| 4,520,605 A | * | 6/1985 | Budd | A47K 3/008 52/287.1 |
| 4,601,149 A | * | 7/1986 | Dokan | A47K 3/008 52/287.1 |
| 4,706,427 A | * | 11/1987 | Zeilinger | A47K 3/008 52/287.1 |
| 4,719,733 A | * | 1/1988 | Seles | A47K 3/008 52/287.1 |
| 4,829,730 A | * | 5/1989 | Zeilinger | A47K 3/001 52/287.1 |
| 4,837,997 A | * | 6/1989 | Zeilinger | A47K 3/008 52/287.1 |
| 6,527,278 B1 | * | 3/2003 | Norris | F16J 15/348 403/231 |
| 6,945,540 B2 | * | 9/2005 | Bormann | B60J 10/21 49/303 |

(Continued)

FOREIGN PATENT DOCUMENTS

| | | |
|---|---|---|
| DE | 102017110057 A1 | 11/2018 |
| DE | 202020100594 U1 | 2/2020 |

(Continued)

OTHER PUBLICATIONS

European Search Report in corresponding European Patent Application No. 22157396.7 dated Jun. 28, 2022.

(Continued)

*Primary Examiner* — Nicholas L Foster
(74) *Attorney, Agent, or Firm* — Westman, Champlin & Koehler, P.A.

(57) ABSTRACT

The invention relates to a ring-shaped joint tape for use in sanitary applications. The joint tape is designed to cover joints passing around sanitary objects.

19 Claims, 4 Drawing Sheets

(56) References Cited

U.S. PATENT DOCUMENTS

| | | | | |
|---|---|---|---|---|
| D807,531 | S | * | 1/2018 | Manning ............... F16J 15/061 |
| | | | | D25/119 |
| D1,009,614 | S | * | 1/2024 | Nguyen ..................... D12/345 |
| 2003/0175482 | A1 | * | 9/2003 | Porter ..................... F16J 15/14 |
| | | | | 277/654 |
| 2005/0177936 | A1 | | 8/2005 | Graells Pane |
| 2008/0134602 | A1 | * | 6/2008 | Schick ............... E04F 19/0486 |
| | | | | 52/287.1 |
| 2021/0226285 | A1 | * | 7/2021 | Ono ....................... F16J 15/061 |
| 2021/0317701 | A1 | * | 10/2021 | Azer ..................... E06B 7/2303 |
| 2022/0333724 | A1 | | 10/2022 | Weih et al. |

FOREIGN PATENT DOCUMENTS

| | | |
|---|---|---|
| EP | 3097328 B1 | 2/2019 |
| EP | 4323681 | 2/2024 |
| WO | 2022221093 A1 | 10/2022 |

OTHER PUBLICATIONS

Linda's Essentials Silicone Kitchen Stove Counter Gap Covers (2 Pack) retrieved on Dec. 15, 2022, <https://lindas-essentials.com/products/b07wtxwc32>, 4 pages.

Linda's Essentials Silicone Stove Gap Covers (2 Pack) retrieved on Dec. 27, 2022, <https://www.amazon.com/Lindas-Essentials-Silicone-Stove-Gap-Covers-Stove-Guard/dp/B01MTOUL8N?th=1>, 7 pages.

Office Action in corresponding European Application Ser. No. 22157396.7 dated Nov. 20, 2024.

* cited by examiner

RING-SHAPED JOINT COVER

CROSS-REFERENCE TO RELATED APPLICATION(S)

This application claims priority from European Patent Application No. 22 157 396.7, filed on Feb. 18, 2022, in the European Patent Office, the disclosure of which is incorporated herein by reference in its entirety.

BACKGROUND

The present invention relates to a joint cover for use in sanitary applications. More specifically the present invention relates to a joint tape for covering joints at wall-mounted sanitary objects.

In wet rooms, especially sanitary rooms, it is common practice to close all joints between floors, walls and thereto installed objects. This is done firstly to achieve a visual finish, secondly to prevent dirt and liquid from entering and collecting in the joints, thirdly to simplify cleaning and finally to protect the walls themselves. Without a joint cover, mildew would likely occur and sensitive wall materials would quickly wear out due to usual cleaning in the corners and around sanitary objects.

Thus, in sanitary rooms, joints between sanitary objects such as WCs, bidets, urinals or wall-mounted washstands and the tiled, plastered or wallpapered walls have always been provided with silicone seams to close the gap between the sanitary object and the wall.

Creating silicone seams is time-consuming and therefore costly. First, more silicone as actually needed is applied along the joint using a silicone syringe with a tube of silicone clamped into it. In a next step, the silicone is smoothed out with special jointing tools and excess material is removed. Any accurate finishing work required on the silicone seam is then done using a finger dipped in a bowl of water and detergent mixture. Finally, the silicone seam must dry for 12 to 24 hours. Until the silicon seam is fully dried it must not get wet, must not be touched and must not get stressed. So, sanitary objects which are freshly siliconized cannot be used during this drying period. The excess silicone from the installation process is discarded. Frequently, there is also a left over in the silicone tube which is discarded since it can no longer be used if there is not enough residual material for the next joint length.

The described work of siliconizing requires a clean and conscientious execution, so a skilled worker with appropriate expertise and several tools is needed. Still, the appearance of the silicone seam strongly depends on the dexterity of the worker. Additionally, depending on the shape of the object, it varies in difficulty to always draw a neat joint of the same thickness and this is why often each joint looks slightly different.

Despite their complex and cost-intensive installation, durability of conventional silicone seams is limited due to several reasons. First, silicone joints crack with time due to aging of the material and due to work of the building elements against each other. Secondly, there may be repair work on a sanitary object for which it is necessary to dismantle it and therefore break up the silicon seam. Anyway, the silicone seam has to be renewed just as elaborately, whereby the clean removal of a worn silicone seam often leads to further effort. So, replacement often results in even greater costs and effort than initial installation. Moreover, the removed silicone seams are broken and not reusable, so they need to be discarded.

All in all, conventional silicone seams are time-consuming and costly in installation and renewal, have limited service life and lack sustainability. Nevertheless, using conventional silicone seams in sanitary rooms is still common practice although other sealing methods are known which overcome at least some disadvantages of the above described silicon seams.

Disclosed in DE 10 2017 110 057 A1 is a tear-resistant joint cord for use in sanitary rooms. Further disclosed is a process to seal a joint between two walls or objects using the presented joint cord in combination with a sealing material. According to the presented process a joint cord is positioned fully inside the joint and the joint is covered with a sealing material, e.g. silicone which adheres to the joint cord. Thus, the complete joint sealing including the sealing material can easily be removed by cutting the sealing material from the walls and pulling the joint cord out of the joint. So, removal of the silicone seam is simplified. Nevertheless, producing a neat silicone seam still requires almost as much effort and knowledge as described above, durability is only slightly increased and the joint cord is not reusable.

DE 20 2020 100 594 U1 discloses a joint sealant for sealing and covering joints between surfaces arranged at an angle to each other. This joint sealant has a visible side and an opposite contact side and comprises a base body. The base body has on its contact side at least one fastening pin which extends away from the contact side and is formed at least in regions from a material which is softer or more flexible than the material from which the base body is formed. Further, the base body has on one side in each case sealing ends which are formed from a material which is softer or more flexible than the material of the base body. The joint sealant is designed to be pushed into a joint so that the fastening pin keeps the sealant in its position and the sealing ends cling to walls or objects which are in angular position. To secure the sealant in its position, the fastening pin is barbed and it is suggested to stick the joint sealant into the joint by using any kind of adhesive or silicone. Either way, it is not possible to easily remove this joint sealant if necessary and reusability is not given. Moreover, the joint sealant is complex in its material structure since different properties are required in different zones. The base body's properties are stiff compared to the other elements of the joint sealant, so to provide a good design for use along tiled walls, floors or shower trays. Nevertheless, for installation in tight radii or around angles, the base body lacks flexibility and the fastening pin lacks retention force. Hence, the presented joint sealant cannot be used to seal joints around a majority of known sanitary objects.

Thus, there is a need to replace well-known silicone seams around sanitary objects, by means that overcome above described disadvantages.

SUMMARY

Embodiments of the present invention provide a joint sealing for joints around wall-mounted or standalone sanitary objects which improve the state of the art at least in terms of installation effort and/or sustainability.

According to embodiments of the present invention such beneficial effects can be achieved by a ring-shaped joint tape for covering a joint, wherein the joint tape comprises elastic material and has one outer side and at least one right side flank and at least one left side flank which together enclose a volume which in cross-section is asymmetrically tapering.

In this context, ring-shaped describes the shape which is created when the two ends of a deformable elongated body, which has a small cross-sectional area in relation to its length, are brought together by deforming the body in one deformation plane, while deformability of the body is at least big enough so that it is possible to bring the two ends together without breaking the body. Hence, in the context of the present invention, the term ring-shaped does not imply being circular or rotationally symmetric. For the ring-shaped body, a geometric center can be determined. An axis running through this center and being perpendicular to the deformation plane is called center axis.

Herein, an outer side of a ring-shaped body is an outer side if none of the normals from any surfaces of the outer side is oriented towards or in parallel to the body's center axis. In installed condition the outer side of the joint tape is the visible side which covers the joint.

In this context, all surfaces which do not fulfill the criterion of being an outer side are either side flanks or inner sides. Inner sides are defined by having only normals which are oriented towards the body's center line. A side flank may comprise one or more surfaces with normals which are oriented in any direction but one side flank comprises only surfaces which are connected to each other and have an exterior angle of less than 180° to each other.

Elastic material is defined as any material which shows elasticity wherein elasticity is the property of a material to change its shape when a force is applied and to return to its original shape when the applied force is removed. Preferably, elastic material in this context shows the described behavior under standard conditions while a minimum engineering strain of 10% can be achieved during applying stress smaller than 30 MPa. So, it is suitable to be used in applications as described in the following.

The ring-shaped joint tape of the present invention is designed to cover a joint passing around a wall-mounted or standalone sanitary object. Such a sanitary object may be a WC, urinal, washbasin or any object which is used in sanitary rooms. The gap between a mounted sanitary object and the preferably plane surface, e.g. a wall or a floor, where the sanitary object is mounted to is called joint. The distance between the sanitary object and the named surface defines the joint's width. Moreover, in the context of the present invention, the joint comprises a circumference which is defined by being identical to the circumference of the sanitary object in its mounting section.

Covering the described joint is necessary to finish the installation of the sanitary object. According to embodiments of the present invention this can be done by putting the ring-shaped joint tape over the sanitary object by elastic stretching. The joint tape is guided into the joint and due to the ring-shape in combination with elasticity, tensile forces are acting on the tape and pressing it partly into the joint. The inventive, asymmetrically tapering geometry of the joint tape ensures an ideal fit in the joint and causes parts of the side flanks to cling to adjacent surfaces after installation, so, the joint tape is at least partly in contact to the circumference of the sanitary object's mounting section and preferably the joint tape is sealing the joint against environmental impacts such as dust, liquids or moisture. Among other things, the joint tape's outer side provides a visual finish to the joint and is easy to clean. Thus, the application of the ring-shaped joint tape provides a good sealing and optical finish to the joint. Installation and removal of the ring-shaped joint tape are preferred to be performed without using any tools and without expert knowledge. As a result, the ring-shaped joint tape preferably is reusable.

Preferably, the ring-shaped joint tape comprises at least one concavely shaped right side flank, at least one concavely shaped left side flank and one outer side which preferably has a convexly shaped contour. As it will be apparent to the skilled person, left and right side could also be exchanged depending on the orientation of the cross-section.

In this context, the well-known definitions of concave and convex shapes relate to the cross section of the joint tape's unwinding. It is pointed out that in cross section, a concave or convex contour may comprise several edges from partial surfaces building corners. The contour therefore may not be differentiable in every point but still fulfils the criterion of being concave or convex.

Further description of the invention includes angles which are taken from the cross section of the joint tape's unwinding. Preferably, this cross section is invariable over the entire length of the unwound joint tape. Angle specifications at curved edges are related to the corresponding envelopes.

Preferably, the concavely shaped left side flank adjoins the outer side with a first inner angle of 15° to 50°, particularly preferably 25° to 40°, and comprises three surfaces wherein a first surface adjoins the outer side, a third surface adjoins either the right side flank or an additional existing inner side of the ring shaped joint tape and a second surface is arranged in between the first and the third surface. The second surface is arranged in an angle of 155° to 175° towards the first surface and in an angle of 115° to 135° towards the third surface.

The concavely shaped right side flank preferably comprises at least two surfaces wherein the first surface adjoins the outer side and is in angular position towards a second surface. Preferably, the first surface is convexly shaped and adapted to cling to a planar surface. It is preferred that the edge of the first surface in cross section has a length of 1 mm to 20 mm, preferably 1 mm to 10 mm, particularly preferably 1.5 mm to 6 mm. Furthermore, the first surface preferably adjoins the outer side with a second inner angle of 5° to 55°, particularly preferably 20° to 40°. Preferably, the two surfaces of the right side flank form a third angle of 115° to 170°, particularly preferably 135° to 150°. These preferred shapes of the side flanks are advantageous for an ideal fit into a joint which is in between a wall-mounted sanitary object and the wall itself.

Preferably, the left and the right side flank are not symmetrical. It is further preferred, that the above defined second angle is smaller than the first angle. Hence, two sealing lips with different material thickness are created, one of which can be advantageously applied to the sanitary object, the other to an angular oriented surface, e.g. a tiled wall.

For fitting into standard sized joints in sanitary applications, the ratio of cross-sectional width to cross-sectional height of the joint tape is preferred to be between 0.3 and 0.8, particularly preferably between 0.4 and 0.6. The cross-sectional height relates to the unwinding of the ring-shaped joint tape and is defined by the height over the outer side. The cross-sectional width defines the expansion of the cross-section perpendicular to the height. The cross-sectional height is preferably 2 mm to 40 mm, particularly preferably 4 mm to 15 mm while the cross-sectional width is preferably 5 mm to 60 mm, particularly preferably 8 mm to 25 mm. Moreover, the edge of the concavely shaped left side flank preferably is at least twice as long, particularly preferably three to four times as long as the edge of the right side flank's first surface.

Although it is possible that the left side flank and the right side flank taper towards further side flanks or an additional inner side which is basically concentrically to the outer side, it is preferred that at least one surface of the left side flank and at least one surface of the right side flank adjoin each other, preferably with an angle of 25° to 45°, forming a tip which is slightly tilted to the concavely shaped left side flank.

Preferably, the described ring-shaped joint tape has a circumference between 20 cm and 400 cm, particularly preferably between 60 cm and 200 cm. The joint tape's circumference is defined by the smallest inner circumference of the ring-shaped joint tape. Depending on the specific design, this may either be the circumference of the edge formed by a tip or it may be the minimum circumference of a joint tape's inner side.

It is preferred that the joint tape is made of homogeneous material and comprises at least one of the following materials: silicone rubber, acrylic rubber, nitrile rubber. If any type of rubber is comprised in the joint tape, the rubber percentage preferably is at least 35% by weight (wt %), particularly preferably at least 50 wt %. Of course, the joint tape can also be made of inhomogeneous material or can comprise any other material which has at least minimal elastic properties as e.g. polymers, in particular organic silicone substitutes, foam material or thermoplastic urethanes (TPU).

Furthermore, it is preferred that the joint tape comprises a material with a Young's modulus under standard conditions between 0.01 N/mm$^2$ and 30 N/mm$^2$, particularly preferably 0.1 N/mm$^2$ to 10 N/mm$^2$, a tensile strength of at least 5 N/mm$^2$ and an elongation of break in the area of 100% to 1000%. The materials Young's modulus, tensile strength and elongation of break are determined under standard conditions by using a tensile test with a deformation rate of 50 mm/min.

It is preferred that the circumference of the ring-shaped joint tape can be sufficiently extended comfortably by usual manual force. This property can be determined with a test stand comprising two round pins with a diameter of 50 mm, which are stiff in relation to the test material. One pin is fixed, the other pin is equipped with a load cell and arranged to move on an axis in such a way that the distance between the two pins can be adjusted as required. First, the test specimen (ring-shaped joint tape) is placed around the two pins in completely unloaded condition. Then, the distance between the pins is increased until a force of 1 N is applied to the movable pin. The distance between the two pins in this position is defined as the initial length of the test specimen. Now, the distance between the two pins is increased until a force of 50 N is applied to the movable pin. The distance between the two pins in this position is defined as the extended length of the test specimen. Thus, the quotient of the extended length to the initial length describes, how far the test specimen is extendable with the applied force. In the current invention it is preferred that the ring-shaped joint tape is extendable to at least 105%, preferably to at least 110%, preferably to at least 120%, preferably to at least 130%, preferably to at least 140%, preferably to at least 150%, particularly preferably to at least 160% when applying a force of 50 N.

The above described properties are in particular advantageous to install the joint tape to standard-sized sanitary objects without using tools. Applying the ring-shaped joint tape in sanitary rooms it is preferred to offer the joint tapes in the colors white, black and grey. Nevertheless, it is possible as well to produce the joint tape in any other color.

Preferably, the ring-shaped joint tape is designed to be produced firstly as an elongated joint in extrusion process. Thereafter it is cut to specific lengths and either gets closed to its ring shape preferably by a substance-to-substance bond via adhesives or thermal joining or further preferred it is equipped with a connection element as described below.

The present invention further relates to a ring-shaped joint tape comprising a connection element. Thus, the joint tape can either be ring-shaped ex-factory, wherein it is closed to its ring shape by using a connection element or it can exist as a set comprising an elongated joint tape, wherein the joint tape comprises elastic material and has one outer side and at least one right side flank and at least one left side flank which together enclose a volume which in cross-section is asymmetrically tapering, and a connection element.

This way, the joint tape is not only offered in closed ring-shape with standard circumferences for standard-sized sanitary objects but also as an elongated joint tape with arbitrary lengths and the connection element. Hence, the elongated joint tape can be cut individually to the length needed directly on site and closed to its ring shape by using the connection element.

It is preferred that the connection element comprises at least one spike, preferably two spikes, preferably four spikes, preferably six spikes, particularly preferably eight spikes and has a length of at least 30 mm, particularly preferably at least 50 mm, extending along the joint tape's longitudinal direction. So, the connection element is able to fix the ends of the elongated joint tape securely.

Although the connection element might be a single part, it is preferred that the connection element comprises at least two parts and it is further preferred that the inner contour of the connection element at least partly corresponds to the outer contour of the joint tape. Hence, additional clamping effect ensures a safe connection.

The connection element preferably comprises metal, particularly preferably it is made of non-corrosive metal such as stainless steel or aluminum. Nevertheless, a connection element made of other materials and material combinations such as plastics, rubber, ceramics or composite materials is possible as well. It is preferred to produce the connection element mainly via sheet metal forming, extrusion or any type of additive manufacturing. If required, spikes may be applied in an additional manufacturing step.

Nevertheless, the connection element is not limited to be a stiff, dimensionally stable element which is specifically produced but simply may comprise any type of tape, wire or hose. For example, the connection element may be silicone shrinking tape, adhesive tape or shrinking hose.

It is preferred, that the described joint tapes are adapted to be reusable and are preferably used to cover a joint which is located between two adjacent surfaces which are in angular position towards each other, particularly preferably a joint between a wall and a wall-mounted sanitary object. In any way, it is preferred that installation can be performed without using any tools and the installed joint tape preferably clings to at least one of the adjacent surfaces.

The present invention further relates to a method of covering a joint passing around a sanitary object, the joint having a circumference, the method comprising the following steps:
(a) Providing a ring-shaped joint tape with a circumference smaller than the joint circumference;
(b) Expanding the ring-shaped joint tape elastically to a circumference greater than the joint circumference;
(c) Installing the ring-shaped joint tape by slipping it over the sanitary object so that it covers the joint.

Method step (a) on the one hand refers to a standard-sized ring-shaped joint tape ex-factory, on the other hand, the step of providing a ring-shaped joint tape comprises four partial steps: Firstly, providing an elongated joint tape, wherein the joint tape comprises elastic material and has one outer side and at least one right side flank and at least one left side flank which together enclose a volume which in cross-section is asymmetrically tapering. Secondly, if necessary, cutting the joint tape to the length needed. Thirdly, forming the elongated joint tape into a ring shape and finally connecting the two ends of the joint tape by using a connection element. It is preferred that the joint tape's circumference is 70% to 99%, particularly preferably 75% to 95% of the joint circumference.

In method step (b) it is preferred, that the joint tape's circumference is expanded to least 105%, preferably to at least 110%, preferably to at least 120%, preferably to at least 130%, preferably to at least 140%, preferably to at least 150%, particularly preferably to at least 160% of the joint circumference by usual manual force, preferably without using tools.

The installation in method step (c) is preferred to be performed without using tools. Depending on the circumference of the joint and the size of the sanitary object it may be practical to first press a part of the ring-shaped joint tape into a part of the joint and subsequently slip the joint-tape over the sanitary object while guiding the flanks into the joint. Sometimes it may be more practically to first slip the whole ring-shaped joint tape over the sanitary object, so it is located close to the joint and subsequently guide the joint tape into the joint around the whole circumference. Experienced installers may twist the ring-shaped joint tape first, slip it over the sanitary object and twist it back again so it flips precisely into the joint. Either way, the installer finally should check whether the joint tape is installed correctly meaning it fits securely, closes the joint towards the adjacent surfaces and looks neat. If necessary, minor corrections could be performed.

The described method may further comprise one or more of the next steps:
(d) Removing the ring-shaped joint tape completely from the joint, preferably without any tools.
(e) Reusing the removed ring-shaped joint tape for covering the same or another joint.

While it is preferred to perform method step (d) without using tools, it is dependent on the joint tape configuration used if this is possible. In some cases, it may be necessary to use something like a screwdriver to dismantle the joint tape at one point. Thereafter the joint tape can be removed without tools, only by pulling or twisting it out of the joint and expanding the joint tape so as to remove it from the sanitary object. The joint tape may remain on the sanitary object so it can be used again to cover the same joint at the same sanitary object (step (e)). Likewise, it is possible to fully remove the joint tape, not only from the joint but also from the sanitary object. If this is done, it still is preferred that the joint tape is reused. According to method step (e) this should be possible either for the same joint, for example with a new sanitary object, or for another joint. If it is necessary to change the joint tape's length for reusing it, this can be done by opening the connection element or cutting the ring-shaped joint tape, so it is back in its elongated shape. Next, the joint tape's length may either be shorted by cutting it or extended by using further one or more connection elements and joint-tape pieces. Finally, the joint-tape gets formed back to its ring-shape and closed with a connection element which may be the same as originally used, another used one or a new one.

The present invention also relates to the following aspects:
1. Ring-shaped joint tape for covering a joint, wherein the joint tape comprises elastic material and has one outer side and at least one right side flank and at least one left side flank which together enclose a volume which in cross-section is asymmetrically tapering.
2. Joint tape according to aspect 1 wherein at least one side flank is concavely shaped.
3. Joint tape according to aspect 2 wherein the concavely shaped side flank adjoins the outer side with a first inner angle of 15° to 50°, preferably 25° to 40°.
4. Joint tape according to any of the preceding aspects wherein at least one side flank comprises at least two surfaces wherein the first surface adjoins the outer side and is in angular position towards a second surface.
5. Joint tape according to aspect 4 wherein the first surface is convexly shaped and adapted to cling to a planar surface.
6. Joint tape according to any of aspects 4 to 5 wherein the first surface of the side flank adjoins the outer side with a second inner angle of 5° to 55°, preferably 20° to 40°.
7. Joint tape with two side flanks according to aspect 6, wherein the second angle is smaller than the first angle.
8. Joint tape according to any of aspects 4 to 7 wherein the two surfaces form a third angle of 115° to 170°, preferably 135° to 150°.
9. Joint tape according to any of aspects 4 to 8 wherein the first surface in cross-section has a length of 1 mm to 20 mm, preferably 1 mm to 10 mm, particularly preferably 1.5 mm to 6 mm.
10. Joint tape with two side flanks according to any of aspects 4 to 9, wherein the edge of at least one side flank in cross-section is at least twice as long, preferably three to four times as long as the edge of the cross-section of the first surface.
11. Joint tape according to any of the preceding aspects wherein the ratio of cross-sectional width to cross-sectional height is between 0.3 and 0.8, preferably between 0.4 and 0.6.
12. Joint tape according to any of the preceding aspects wherein at least one surface of the left side flank and at least one surface of the right side flank adjoin each other forming a tip which is slightly tilted towards one side flank.
13. Joint tape according to any of the preceding aspects wherein the ring-shaped joint tape has a circumference between 20 cm and 400 cm, preferably between 60 cm and 200 cm.
14. Joint tape according to any of the preceding aspects wherein its outer side in cross-section has a convexly shaped contour.
15. Joint tape according to any of the preceding aspects wherein the joint tape is made of homogeneous material.
16. Joint tape according to any of the preceding aspects comprising a material with a Young's modulus under standard conditions between 0.5 N/mm$^2$ and 30 N/mm$^2$, particularly preferably 1 N/mm$^2$ to 10 N/mm$^2$.
17. Joint tape according to any of the preceding aspects wherein the joint tape comprises at least one of the following materials: silicone rubber, acrylic rubber, nitrile rubber.
18. Joint tape according to aspect 17 wherein the rubber percentage is at least 35 wt %, preferably at least 50 wt %.
19. Joint tape according to any of the preceding aspects wherein the joint tape is extendable to at least 110%, preferably to at least 130%, particularly preferably to at least 160% if a force of 50 N is applied.
20. Joint tape according to any of the preceding aspects wherein the joint tape comprises a connection element.
21. Joint tape according to aspect 20 wherein the connection element comprises at least one spike, preferably two spikes, particularly preferably eight spikes.
22. Joint tape according to any of aspects 20 to 21 wherein the connection element comprises at least two parts.
23. Joint tape according to any of aspects 20 to 22 wherein the inner contour of the connection element at least partly corresponds to the outer contour of the joint tape.
24. Joint tape according to any of aspects 20 to 23 wherein the connection element has a length of at least 30 mm, preferably at least 50 mm, extending along the joint tape's longitudinal direction.
25. Joint tape according to any of aspects 20 to 24 wherein the connection element comprises metal, preferably stainless steel.
26. Joint tape according to aspect 20 wherein the connection element comprises a tape, preferably silicone shrinking tape.
27. Joint tape according to any of the preceding aspects which is adapted to be reusable.
28. Set comprising an elongated joint tape, wherein the joint tape comprises elastic material and has one outer side and at least one right side flank and at least one left side flank which together enclose a volume which in cross-section is asymmetrically tapering, and a connection element.
29. Method of covering a joint passing around a sanitary object, the joint having a circumference, the method comprising the following steps:
   (a) Providing a ring-shaped joint tape according to any of aspects 1 to 27 with a circumference smaller than the joint circumference;
   (b) Expanding the ring-shaped joint tape elastically to a circumference greater than the joint circumference;
   (c) Installing the ring-shaped joint tape by slipping it over the sanitary object so that it covers the joint.
30. Method according to aspect 29 wherein the joint tape's circumference is 70% to 99%, preferably 75% to 95% of the joint circumference.
31. Method according to any of aspects 29 to 30 wherein the joint tape's circumference is expanded to at least 110%, preferably 135%, particularly preferably 160% of the joint circumference.
32. Method according to any of aspects 29 to 31 wherein installing the joint tape occurs without any tools.
33. Method according to any of aspects 29 to 32 wherein the joint is located between two adjacent surfaces which are in angular position towards each other.
34. Method according to aspect 33 wherein the joint tape, after installing, clings to at least one of the adjacent surfaces.
35. Method according to any of aspects 29 to 34 further comprising the step:
   (d) Removing the ring-shaped joint tape completely, preferably without any tools.
36. Method according to aspect 35 further comprising the step:
   (e) Reusing the removed ring-shaped joint tape for covering the same or another joint.
37. Method according to any of aspects 29 to 36 wherein the step of providing a ring-shaped joint tape comprises providing an elongated joint tape wherein the joint tape comprises elastic material and has one outer side and at least one right side flank and at least one left side flank which together enclose a volume which in cross-section is asymmetrically tapering, forming the joint tape into a ring shape and connecting the two ends of the elongated joint tape by using a connection element.

The present summary is provided only by way of example, and not limitation. Other aspects of the present invention will be appreciated in view of the entirety of the present disclosure, including the entire text, claims, and accompanying figures.

BRIEF DESCRIPTION OF THE DRAWINGS

In the following, preferred embodiments of the invention are described by way of example with reference to the following figures, which show.

Figure 1:
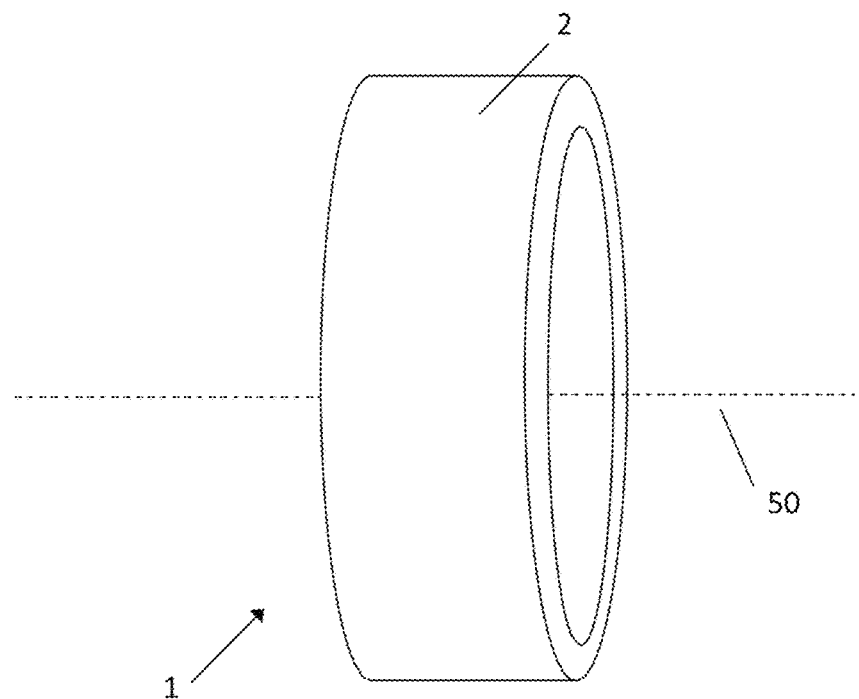
FIG. 1 a schematic 3D-view of a ring-shaped joint tape according to a preferred embodiment.

While the above-identified figures set forth one or more embodiments of the present 5 invention, other embodiments are also contemplated as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or 10 components not specifically shown in the drawings.

DETAILED DESCRIPTION OF ILLUSTRATIVE EMBODIMENTS

FIG. 1 schematically illustrates a ring-shaped joint-tape 1 according to a preferred embodiment. Additionally, the outer side 2 and the center line 50 of the displayed ring-shaped body are indicated.

Figure 2:
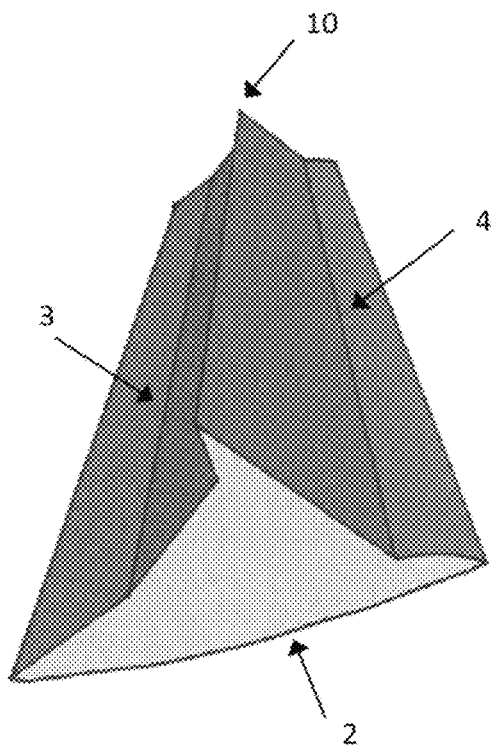
FIG. 2 a 3D-view of a section from the unwinding of a joint tape according to FIG. 1.

FIG. 2 shows a 3D section of the unwinding of the ring-shaped joint tape from FIG. 1. The displayed embodiment comprises an outer side 2, a left side flank 3 and a right side flank 4. As it will be apparent to the skilled person, left and right side could also be exchanged depending on the orientation of the cross-section. Further, an asymmetrical tapering of the two side flanks is visible. In this embodiment, both side flanks are adjoining each other forming a tip 10 which is slightly tilted towards the left side flank. As it is shown in FIG. 2, the cross section is invariable over the entire length of the unwound joint tape.

Figure 3:
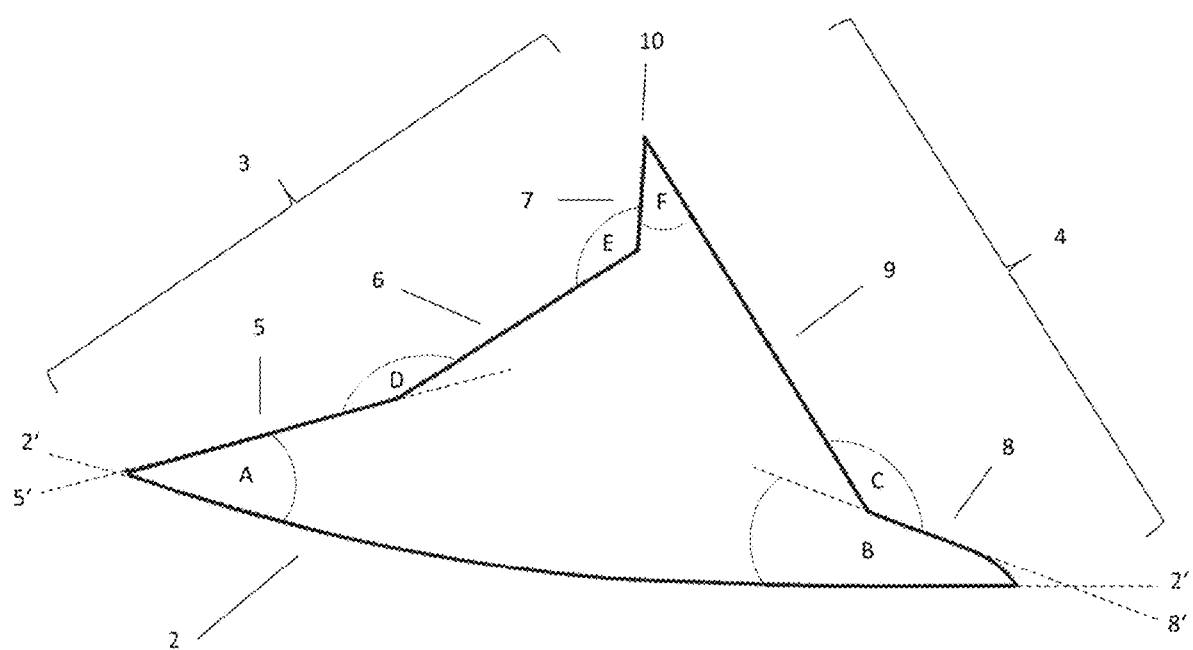
FIG. 3 a cross-section of the joint tape's unwinding from FIG. 2.

In FIG. 3, a cross-section from the joint tape's unwinding from FIG. 2, is shown. In this embodiment, the contour of the outer side 2 is convexly shaped whereas both contours of the left side flank 3 and of the right side flank 4 are concavely shaped. The left side flank 3 of the shown embodiment comprises three surfaces. One first surface 5 adjoins the outer side 2 with an inner angle A, a third surface 7 adjoins the right side flank with an inner angle F and a second surface 6 is located in between the two surfaces 5 and 7. The exterior angle between surface 5 and surface 6 is indicated with letter D. Surfaces 6 and 7 adjoin each other with an exterior angle E. In this embodiment, the right side flank 4 comprises two surfaces. A first surface 8 is convexly shaped to improve installation, adjoins the outer side 2 with an inner angle B and is oriented to a second surface 9 in an exterior angle C. The second surface 9 of the right side flank adjoins the third surface 7 of the left side flank with the inner angle F. Hence a tip 10 is formed. The overall shape of the various tip-shaped extensions in particular governs the functionality of the joint-tape. This shape is connected to the corresponding angles but it is not always obvious how to determine the described angles since some angles are formed by curved contours. Thus, envelopes of these contours are created as indicated with 2', 5' and 8'. The named angles are determined by measuring the angles between these envelopes. Achieving a suitable tip-shape on the left side, it is preferred to have an angle A between 25° and 40°. In the shown embodiment, this angle A is defined by a convexly shaped outer side 2 and a plane surface 5 of the left side flank. In further possible embodiments, this angle A may be formed by differently shaped surfaces, such as a plane outer side and/or a left side flank comprising only one, preferably concavely shaped, surface. Furthermore, embodiments are possible in which the left side flank comprises only two or even more than three surfaces which may be plane or curved while one surface adjoins the outer side with the named angle A and another surface forms the angle F together with the right side flank. While the right side flank comprises two surfaces in the shown embodiment including one convexly shaped surface, this right side flank may be designed to comprise only one surface, preferably concavely shaped, or even more than two plane or curved surfaces, in other embodiments. Nevertheless, it is preferred that angle F is between 25° and 45° to achieve a suitable tip-shaped extension in the upper area of the shown cross section. The right side flank further forms a tip-shaped extension on the right side by enclosing angle B together with the outer side. Thus, angle B is preferred to be between 20° and 40°.

Figure 4:
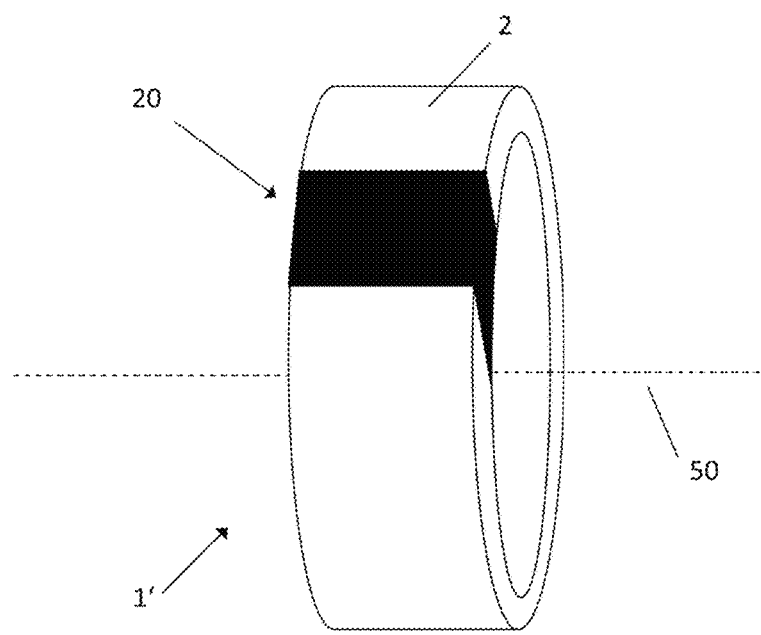
FIG. 4 a 3D-view of a ring-shaped joint tape with connection element according to another preferred embodiment.

FIG. 4 schematically shows another preferred embodiment of a joint-tape 1', which originally has been an elongated string but is formed to its ring-shape by using a connection element 20. Hence, a center line 50 can be determined. Preferably, the shown joint tape 1' comprises a cross-sectional geometry as described within FIGS. 2 and 3.

Figure 5:
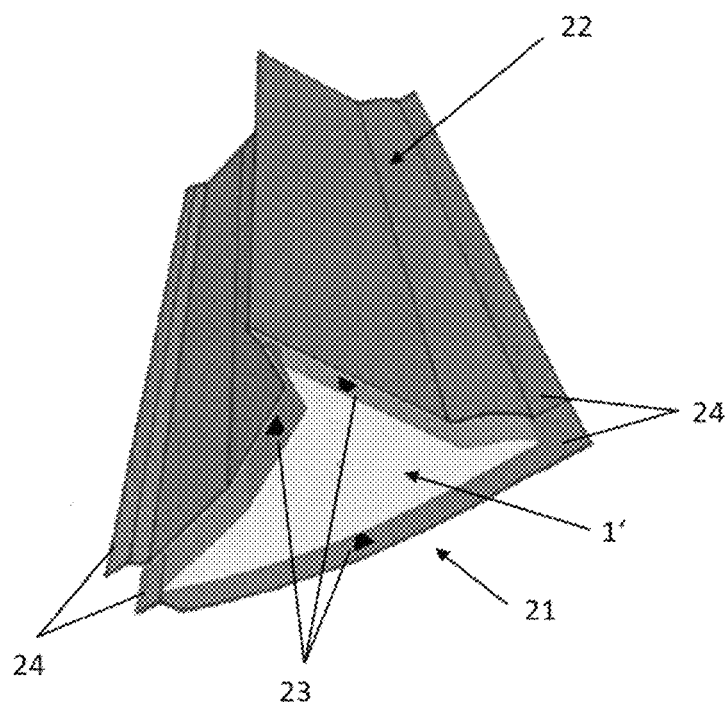
FIG. 5 a 3D-view of a connection element according to a preferred embodiment.

FIG. 5 shows a preferred embodiment of the open connection element 20 in relation to a section of joint tape 1'. The connection element 20 in the shown embodiment is a connection clip comprising two parts, a cavity 22 and a cover 21. Both parts are equipped with spikes 23 on their inner sides and comprise flange surfaces 24. In the shown embodiment, the connection clip is mainly made of stainless steel. First, sheet metal is used to produce the shape by metal forming. Subsequently, the spikes are fixed.

Figure 6:
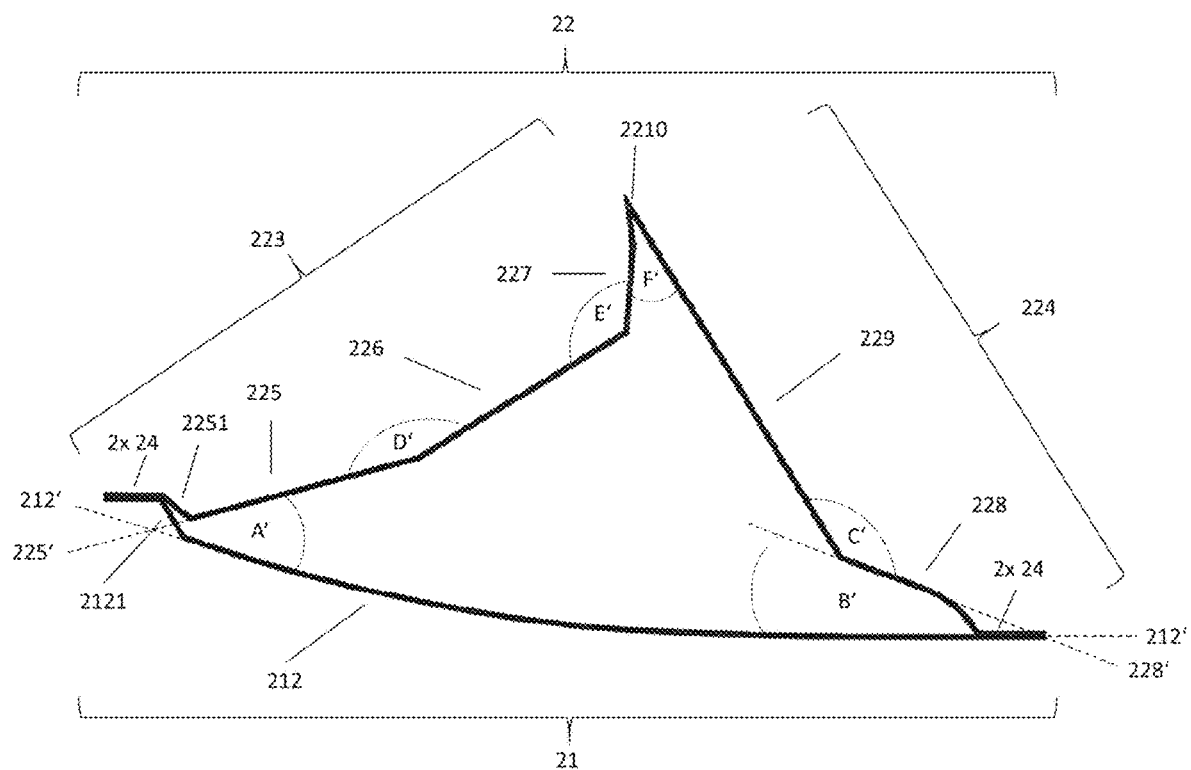
FIG. 6 a cross-section of the connection element from FIG. 5.

The cross-section of the connection clip from FIG. 5 is displayed in FIG. 6. Therein, the connection clip is shown in closed condition. The contour of cover 21 corresponds to the contour of the joint tape's outer side 2 from FIG. 3 and comprises three surfaces: one convexly shaped main surface 212 comprising one flange area 24 on its right side, one connection surface 2121 adjoining the main surface on its left side and connecting it to the third surface which is a further flange surface 24. The cavity 22 comprises a left side flank 223 and a right side flank 224 which correspond to the side flanks 3 and 4 of the joint tape from FIG. 3. While the cavity's right side flank 224 basically comprises two surfaces 229 and 228 and only one additional flange surface 24, the cavity's left side flank comprises, besides the three surfaces 225-227 known from the joint tape's geometry, two further surfaces: connection surface 2251 and a further flange surface 24. In this embodiment, the displayed angles A' to F' correspond to angles A to F from FIG. 3, so the drawn in angle A' ignores the connection surfaces 2121 and 2251. Angle A' is measured between the envelopes of surfaces 225 and 212 to indicate the analogy to angle A from FIG. 3. Nevertheless, due to the two connection surfaces 2121 and 2251, the connection clip in the shown cross-section encloses an area which is slightly bigger than the cross-section of the compressed joint tape. Hence, closing a joint tape with such a connection clip, deformed material can enter the additional cavity built from the connection surfaces 2121 and 2251. Therefore, all flange surfaces 24 can be in direct contact with each other. Thus, no material is trapped between the flanges and so, the connection clip can be closed completely using any kind of well-known connection elements such as clamps, screws, rivets or adhesives.

Figure 7:
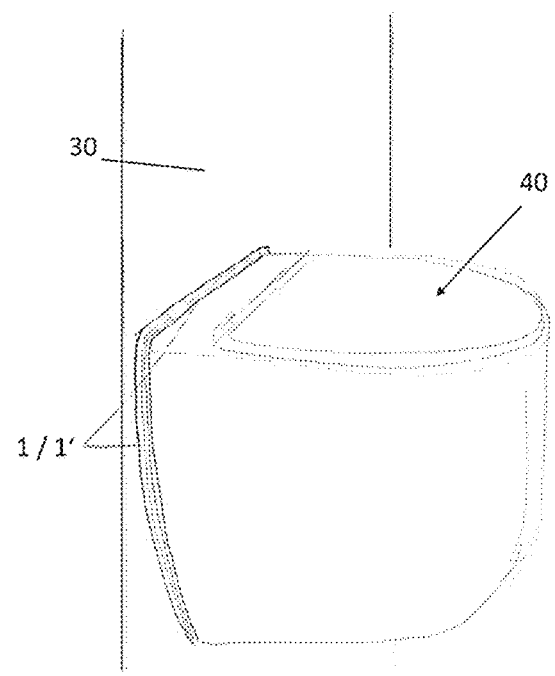
FIG. 7 a 3D-view of a ring-shaped joint tape according to a preferred embodiment installed to a wall-mounted sanitary object.

FIG. 7 shows an installed ring-shaped joint tape 1 or 1'. In this example, the joint tape covers a joint between a wall 30 and a wall-mounted sanitary object 40. The joint passes around the sanitary-object 40.

Figure 8:
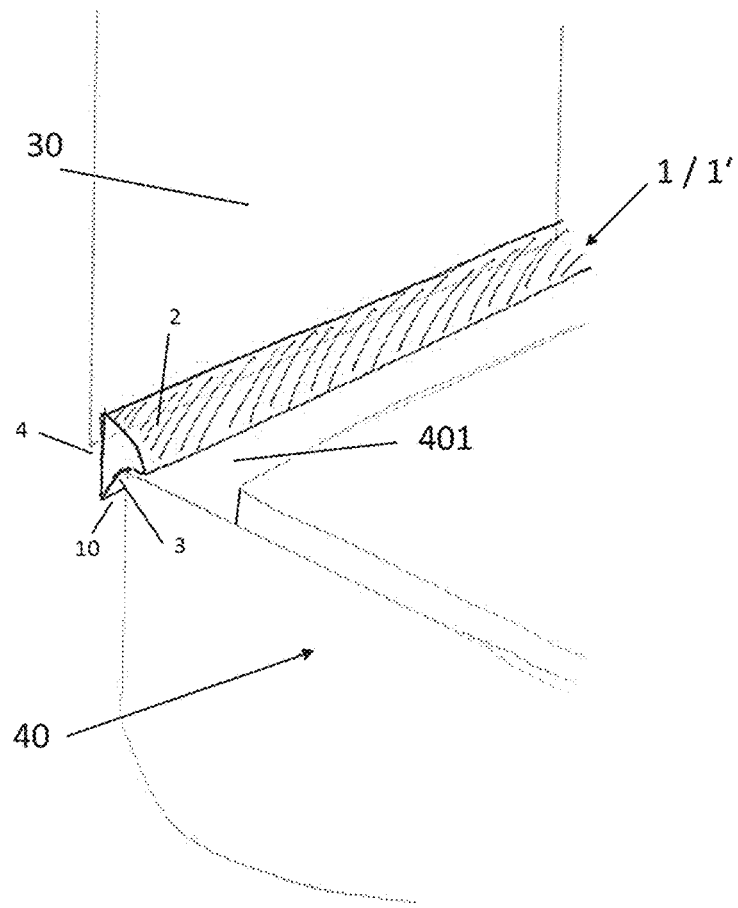
FIG. 8 a perspective cross section through joint tape, wall and sanitary object from FIG. 7.

In FIG. 8, a cross-section of the installation example from FIG. 7 is displayed. The circumferential joint between the wall 30 and the wall-mounted sanitary object 40 is covered by a joint tape 1 or 1' which cling to the surfaces 30 and 401 adjacent to the joint. The installed joint tape is in an elastically stretched state, so the joint tape's circumference is bigger than it was before installation. Due to this elastic stretching, tensile forces act in the joint tape trying to compress it. Caused by the joint tape's ring-shape, these tensile forces act towards the center of the circumferential joint and pull the edge 10 into the joint, as it is illustrated in the figure. As the joint tape's width is larger than the joint's width, the joint tape gets pressed to the adjacent surfaces 30 and 401. The joint tape's elasticity in combination with the tensile effect causes a deformation of the side flanks. Along with the asymmetrically tapering of the joint tape, this enables a precise fit, increases the pressing effect of the joint tape to the adjacent surfaces and ensures the joint tape clings neatly to the adjacent surfaces. Hence, the contours of the originally concavely shaped side flanks 3 and 4 are reshaped in installed condition, so the left side flank 3 clings at least partly to the sanitary object 40 while the right side flank 4 is in contact with the wall 30 and appears almost straight in the installation example. The edge of tip 10 is oriented to the joints center while the joint tape's outer side 2 is the side visible to the user and adapted to ensure a neat look, long durability and easy cleaning of the covered joint.

Although the present invention has been described with reference to preferred embodiments, workers skilled in the art will recognize that changes may be made in form and detail without departing from the spirit and scope of the invention.

The invention claimed is:

1. A joint tape having a ring shape for covering a joint, wherein the joint tape comprises elastic material and has, in cross-section, an outer side that is convex, a right side flank having two major flat surfaces connected by a non-included obtuse angle, and a left side flank having three major flat surfaces connected by respective non-included obtuse angles, which together enclose a volume that is asymmetrically tapering, wherein at least one surface of the left side flank and at least one surface of the right side flank adjoin each other to form a tip which is tilted towards one of the side flanks.

2. The joint tape according to claim 1, wherein the left side flank adjoins the outer side with a first inner angle of 15° to 50°.

3. The joint tape according to claim 1, wherein the right side flank adjoins the outer side with a second inner angle of 5° to 55°.

4. The joint tape according to claim 1, wherein one of the three major flat surfaces of the left side flank is at least twice as long as one of the two major flat surfaces of the right side flank.

5. The joint tape according to claim 1, wherein one of the three major flat surfaces of the left side flank is three to four times as long as one of the two major flat surfaces of the right side flank.

6. The joint tape according to claim 1, wherein a ratio of a cross-sectional width to a cross-sectional height of the joint tape is between 0.3 and 0.8, wherein the cross-sectional height is defined by the height of the joint tape in cross section over the outer side, and the cross-sectional width is measured perpendicular to the cross-sectional height.

7. The joint tape according to claim 1, wherein the elastic material comprises at least 35 wt % of rubber.

8. The joint tape according to claim 1, wherein the joint tape is extendable to at least 110% when a force of 50 N is applied.

9. The joint tape according to claim 1, wherein the joint tape is extendable to at least 130% when a force of 50 N is applied.

10. The joint tape according to claim 1, wherein the joint tape is extendable to at least 160% when a force of 50 N is applied.

11. The joint tape according to claim 1, wherein the joint tape comprises a connection element.

12. The joint tape according to claim 11, wherein an inner contour of the connection element at least partly corresponds to an outer contour of the joint tape.

13. The joint tape according to claim 11, wherein the connection element has a length of at least 30 mm extending along a longitudinal direction of the joint tape.

14. The joint tape according to claim 11, wherein the connection element comprises metal and provides at least one spike engaged with the elastic material.

15. The joint tape according to claim 1, wherein the joint tape having the ring shape is configured to be put over a sanitary object by elastic stretching.

16. The joint tape according to claim 15, wherein the elastic stretching comprises extending the joint tape to at least 110% by applying a force of 50 N.

17. The joint tape according to claim 1, wherein the right side flank further includes, in cross-section, a convex portion.

18. A set comprising:
an elongate joint tape having two ends, wherein the joint tape comprises elastic material and has, in cross-section, an outer side that is convex, a right side flank having two major flat surfaces connected by a non-included obtuse angle, and a left side flank having three major flat surfaces connected by respective non-included obtuse angles, which together enclose a volume that is asymmetrically tapering; and
a connection element which is adapted to connect the two ends of the elongate joint tape.

19. The set according to claim 18, wherein the right side flank of the elongate joint tape further includes, in cross-section, a convex portion.

* * * * *